United States Patent [19]

Plewa et al.

[11] 4,218,003
[45] Aug. 19, 1980

[54] SAUSAGE LOOP-FORMING MACHINE

[75] Inventors: Manfred Plewa, Verden-Dauelsen; Claus-Dieter Jaschinski, Verden; Dieter Meier, Verden-Dauelsen, all of Fed. Rep. of Germany

[73] Assignee: Vemag Verdener Maschinen-und Apparatebau GmbH, Verden, Fed. Rep. of Germany

[21] Appl. No.: 945,527

[22] Filed: Sep. 25, 1978

[30] Foreign Application Priority Data

Oct. 1, 1977 [DE] Fed. Rep. of Germany ....... 2744350

[51] Int. Cl.² ........................................... B65H 17/42
[52] U.S. Cl. ...................................... 226/104; 17/33; 226/105
[58] Field of Search .................... 226/42, 43, 104, 105, 226/106, 107, 118, 119, 108, 115, 117; 17/33

[56] References Cited

U.S. PATENT DOCUMENTS

| 518,508 | 4/1894 | Mather et al. | 226/107 |
| 731,905 | 6/1903 | Howard | 226/104 |
| 1,266,946 | 5/1918 | Hirth | 226/104 |
| 3,191,222 | 6/1965 | Townsend | 17/33 |
| 3,204,844 | 9/1965 | Wallace | 226/104 |
| 3,430,831 | 3/1969 | Burton et al. | 226/105 |
| 3,533,495 | 10/1970 | Wallace | 226/104 X |
| 3,536,240 | 10/1970 | Korsch et al. | 226/104 X |
| 3,552,620 | 1/1971 | Neubeck, Jr. | 226/105 |
| 3,680,757 | 8/1972 | Wallace | 226/105 |
| 3,747,821 | 7/1973 | Neubeck, Jr. et al. | 226/104 |

FOREIGN PATENT DOCUMENTS

| 1293632 | 4/1969 | Fed. Rep. of Germany. |
| 1432560 | 12/1970 | Fed. Rep. of Germany. |
| 1495694 | 12/1977 | United Kingdom .................... 226/104 |

Primary Examiner—Stanley N. Gilreath
Attorney, Agent, or Firm—Wood, Herron & Evans

[57] ABSTRACT

A sausage loop forming machine that includes a series of hooks of novel configuration on an endless horizontal conveyor. The operation of the conveyor is controlled by a novel sensor that senses the number of sausage joints which pass the sensor, thereby controlling the number of sausage links in the loop formed on each hook, i.e., the size of the loop on each hook. A rotating wheel feeder mechanism cooperates with the conveyor and the sensor to supply continuously a link sausage chain in vertical fashion to the conveyor's hooks.

15 Claims, 8 Drawing Figures

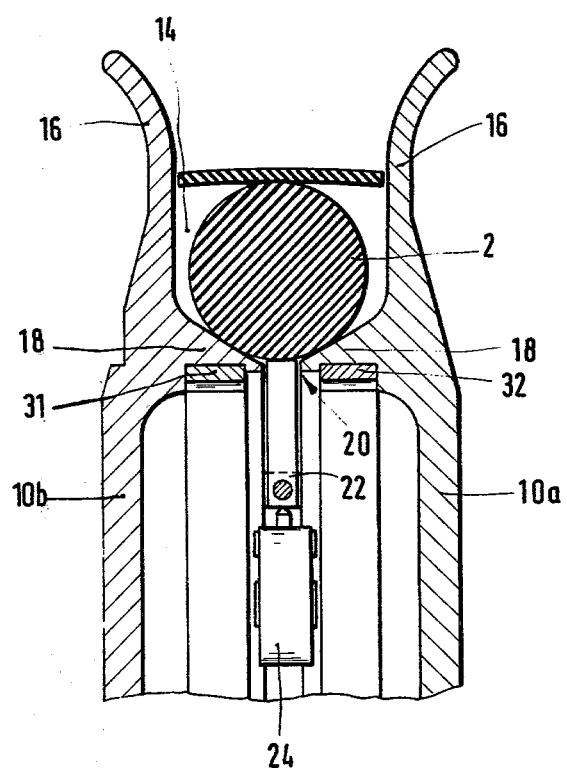

SAUSAGE LOOP-FORMING MACHINE

This invention relates to loop-forming machines. More particularly, this invention relates to an improved loop-forming machine particularly adapted for use with a continuous chain of linked sausages.

Sausages are usually produced in the form of long chains of portioned links. Oftentimes such sausages are smoked after being formed, and when the sausages are to be so treated the sausage chain is formed into a series of loops as the chain leaves the sausage-stuffing machine. As the sausage loops are formed, a limited number of loops are manually removed from the loop-forming device by use of a smoking stick, the loops being thereafter transported into a smokehouse or smoking chamber.

There are prior art loop-forming machines known which are particularly adapted for use with sausage chains to form loops as the sausage leaves the stuffing machine. One particular such loop-forming machine is illustrated in U.S. Pat. No. 3,191,222, issued June 29, 1965. The machine illustrated in this patent functions to hang the link sausage chain in a series of loops on an endless conveyor immediately upon discharge from a sausage-stuffing machine. However, substantial difficulty is encountered in adjusting the loop-forming machine illustrated in this patent when the individual link sausage length produced by the sausage-stuffing machine is changed. Further, it is difficult, if possible at all, to adjust the size of the loops formed by this prior art loop-forming machine. Furthermore, the machine illustrated in this patent is complex and expensive, both in construction and operation.

Therefore, it has been one objective of this invention to provide an improved loop-forming machine for use with a link sausage chain. The present machine is of simple construction and permits easy adjustment when the individual sausage length is changed at the sausage-stuffing machine. The present machine further permits easy adjustment for establishing different size sausage chain loops and is easy to service and to keep clean.

The loop-forming machine of this invention includes a series of hooks of novel configuration in that the free ends of the hooks are formed by two V or U-sections in different planes. The hooks are connected in spaced relation on an endless conveyor which is disposed in a horizontal plane. The machine further includes a feed device located above the conveyor and which discharges sausage links into the path of the hooks. The operation of the conveyor is controlled by a novel sensor that senses the number of sausages which pass the sensor, thereby controlling the number of sausage links in the loop formed on each hook, i.e., the size of the loop on each hook.

It has been another objective of this invention to provide an improved loop-forming machine for use with a link sausage chain, that machine including a novel feed mechanism which translates the sausage chain into the desired spatial orientation for discharge onto the hooks of an endless conveyor in combination with a sensor that determines the number of sausage links that pass a control point so as to control the size of the loop being formed on each hook. In accordance with this objective, and in the preferred form, the feed mechanism includes a rotatable wheel and an endless belt cooperable with a portion of the wheel's periphery, the sausage chain being positioned between the endless belt and the wheel's periphery for establishing a controlled discharge of the endless chain onto the conveyor's hooks. The sensor preferably is a probe-type sensor which cooperates with the individual links in the endless chain to sense the number of link sausage joints that pass the probe for controlling the number of sausages within each loop to be formed.

Other objectives and advantages of this invention will be more apparent from the following detailed description taken in conjunction with the drawings in which:

FIG. 4 is a cross-sectional view taken along line IV—IV of FIG. 3;

Figures 1, 2:
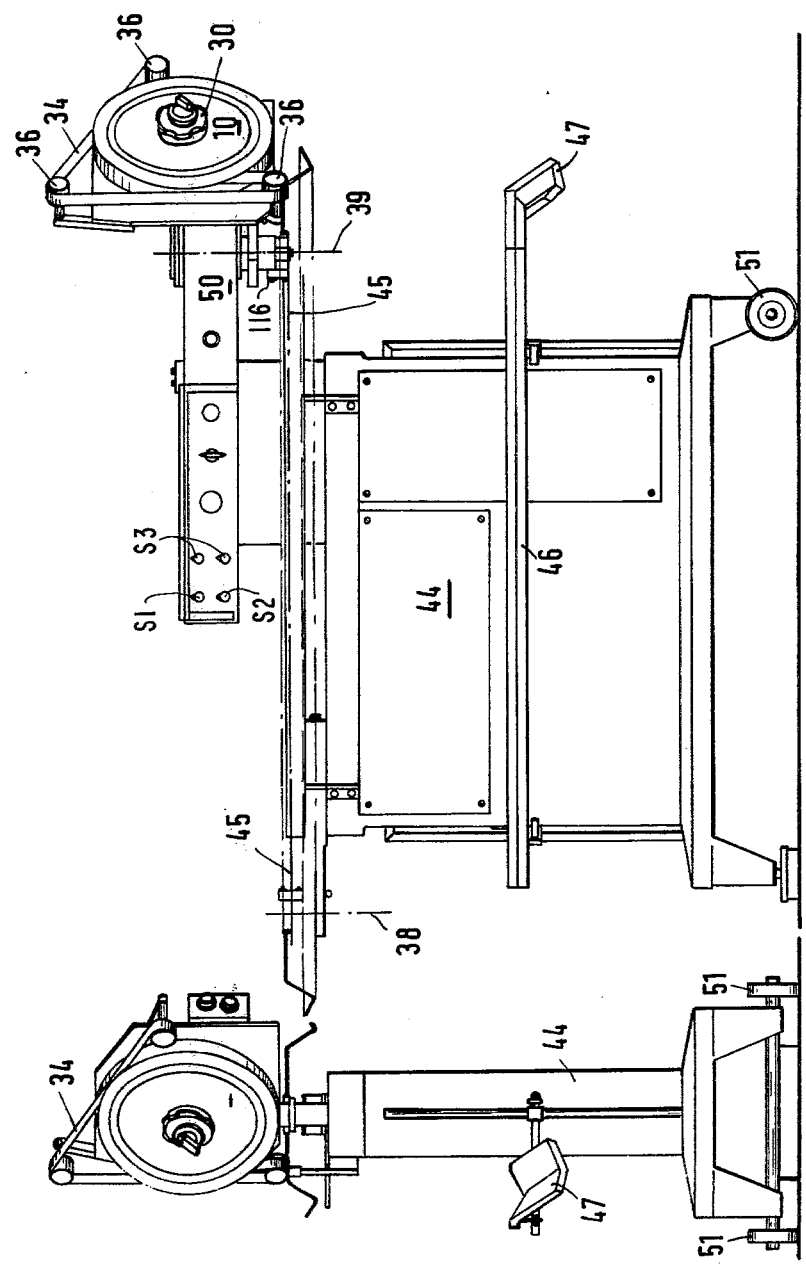
FIG. 1 is a side view of an improved loop-forming machine in accordance with the principles of this invention.
FIG. 2 is an end view of the machine illustrated in FIG. 1.

The preferred embodiment of the sausage loop-forming machine is shown in the drawings. The machine includes a movable, endless-length conveyor which is mounted upon a frame 44 having wheels 51, the conveyor including roller chain 40 and a motor drive mechanism, not shown in detail. A feeder mechanism 10 for the continuous length sausage chain 1 is connected with top mount 50, that mount 50 being connected to frame 44, see FIG. 3. The loop-forming machine can be placed at the outlet of any conventional sausage-stuffing machine, and thereby can handle the sausage chain output as described in greater detail below.

The conveyor's endless roller chain 40, which is mounted upon the frame 44, runs in a horizontal plane 45 between two vertical axes 38, 39. A number of novel hooks 42 are attached at intervals along the roller chain 40, the intervals having a horizontal length which is considerably greater than the diameter of the sprockets at each end of the endless roller chain 40, see FIGS. 1 and 2.

Figure 7:
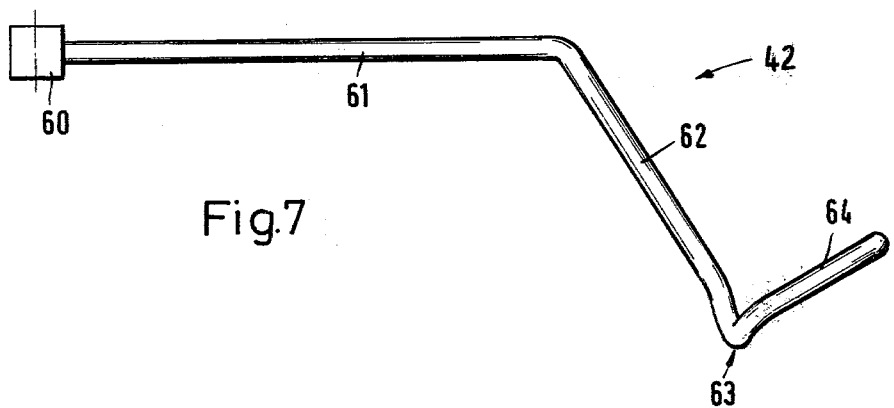
FIG. 7 is a side view of the hook illustrated in FIG. 5.
Figure 6:
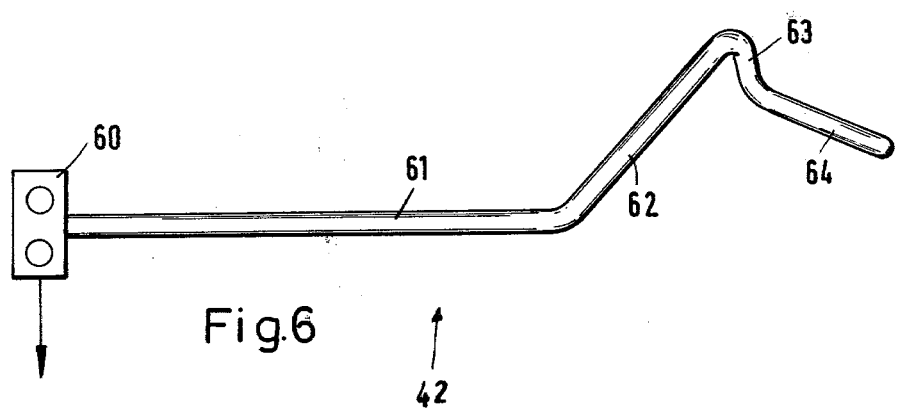
FIG. 6 is a top view of the hook illustrated in FIG. 5.
Figure 5:
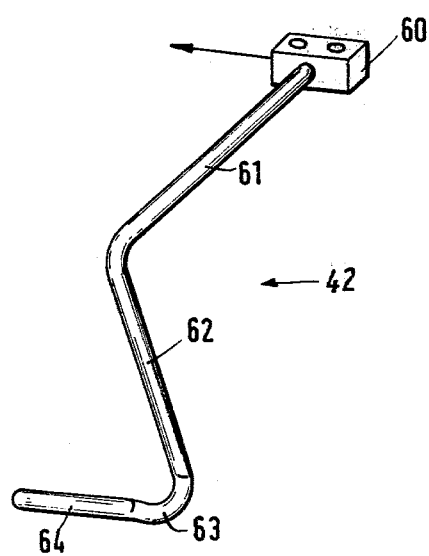
FIG. 5 is a perspective view illustrating the novel structure of one of the conveyor's hooks.

Each hook 42 has a connecting block 60 for attachment to the roller chain. From the connecting block 60 the hook extends into a straight horizontal section 61 which runs into a leading section 62. This leading section is angled down and backwards in the direction of the roller chain movement and forms two planes creating a carrier section 63 which is located at the deepest point of the hook 42 and approximately—in any case with a slight angle of incidence—parallel to the longitudinal axis of the roller chain 40. The carrier section 63 runs finally into the end section 64 of the hook 42. This end section extends in the direction of its free end from the carrier section 63 both upwards (FIG. 7) as well as, in the transport direction of the roller chain, forward (FIG. 6). The direction of movement is indicated in FIGS. 5 and 6 by means of an arrow. Sections 62-64 of the hook 42 are consequently, as seen from above and in the direction of movement, bent into a V-form in two different planes. This hook form insures optimum loop 6 collecting operation as the conveyor moves each hook's carrier section 63 as shown by the direction arrow in FIGS. 3 and 5. Further, this hook form enables a series of loops 6 of the sausage 1 to hank in such a way as to be easily collected by the straight-in movement of a manual smoking stick, not shown.

The machine's feeder mechanism includes a wheel 10 which consists of two discs 10a, 10b that cooperate to define an outer rim groove 14. The rotation common axis 11 of both wheel discs 10a, 10b is horizontal relative to ground. The angle which is formed by the wheel axis 11 with the longitudinal axis of the mechanism, see FIGS. 1 and 2, is adjustable and is preferably 45°. To alter this angle, the entire feed device 10 can be pivoted in its holder on the top mount 50 about the vertical axis 39. Wheel disc 10b is driven by a motor, not shown, and turns upon an axle shaft, not shown, the rotation axis being axis 11. A free-turning pinion 12 is connected to an axle shaft, the pinion's axis being axially parallel to axis 11, see FIG. 3. One portion of pinion 12 fits into an internal ring gear 31 of disc 10b and another portion fits into the internal ring gear 32 of disc 10a, see FIGS. 3 and 4. In this way the rotation of disc 10b is imparted to disc 10a. This structure allows the axial relationship or space 20 at the base of groove 14 between the two discs 10a, 10b to be varied and selectively maintained in a set position for purposes explained in detail below. Also, this structure allows wheel disc 10a to be easily removed to allow access to the inner part of the wheel for cleaning.

A probe-type sausage sensor which, in the preferred form, consists of a microswitch 24 and a feeler arm 22 is positioned in the interior of the wheel formed by wheel discs 10a, 10b. The sausage sensor as shown is electromechanical, but the sensor can also work pneumatically (for example, by means of suction) or can be light-responsive (for example, by means of a photoelectric cell). The microswitch 24 is mounted upon a probe support 28 connected to the axle shaft, not shown, in a manner that allows the support 28 to be turned and adjusted about axis 11 into a fixed position relative to that axis 11. The probe support 28 is tilted about axis 11 for the desired adjustment and is thereafter secured by a set screw 25 (FIG. 8) in final position. The probe support 28, once secured in position, is stationary and maintains its position inside the wheel 10 without turning with discs 10a, 10b. The feeler arm 22 of the microswitch 24 is positioned to extend out through the split 20 between the wheel discs 10a, 10b and is normally biased outwardly relative to the wheel's axis 11. When the feeler arm 22 is not in contact with an individual link sausage 2, it is biased out into the wheel's groove 14 (which is formed laterally by rim protrusions 16 and shoulders 18 on each of wheel discs 10a, 10b).

Figure 3:
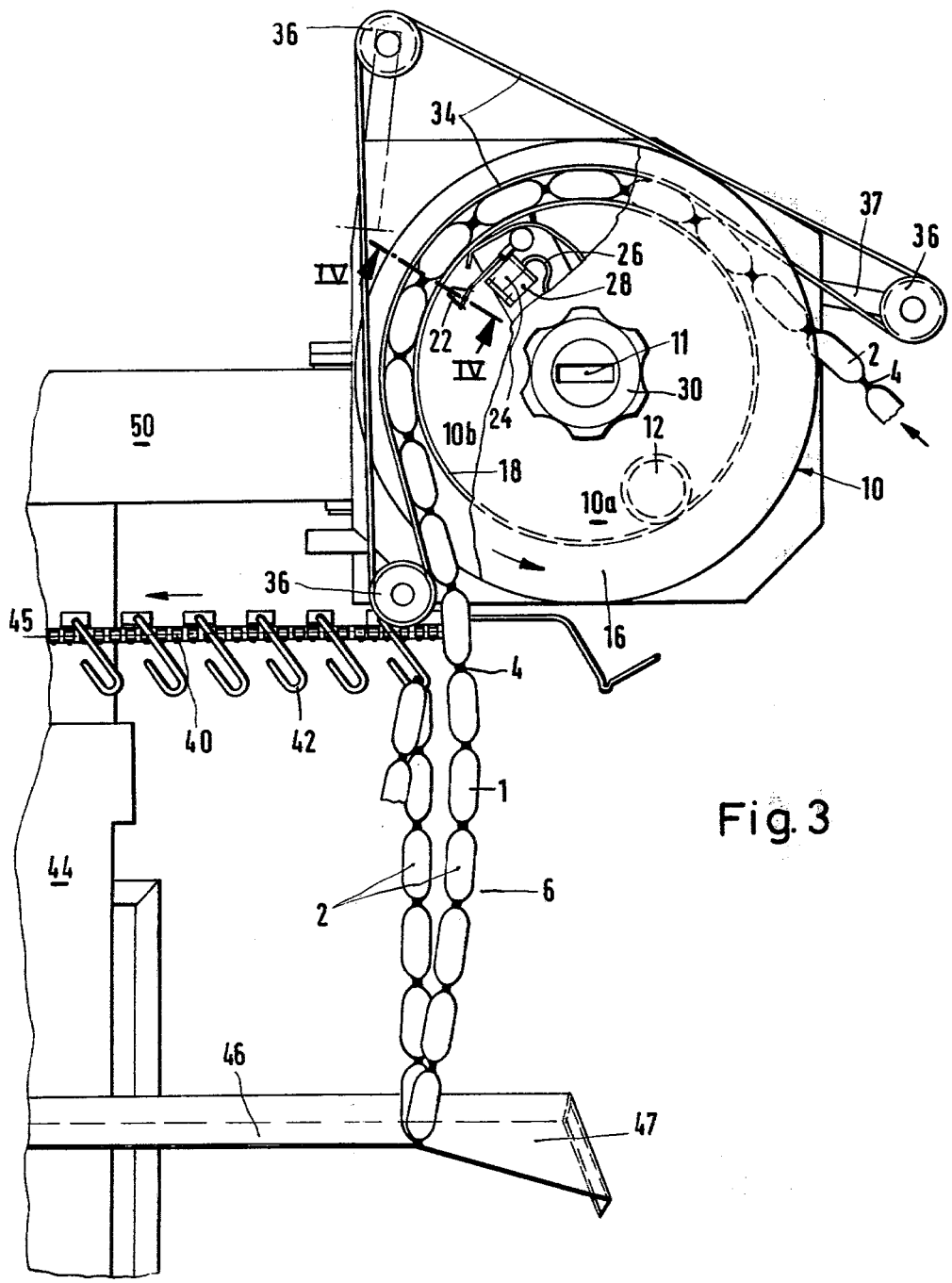
FIG. 3 is an enlarged view of the machine's feeder mechanism.

An endless belt 34 runs over a part of the outer periphery of the wheel's groove 14 and is guided by three rollers 36. One of the rollers 36 is mounted upon a roller support arm 37 which can be tilted on a horizontal axis for adjusting belt tension. Preferably, the belt 34 will span an area of approximately 110° of the wheel's peripheral groove 14. The purpose of this belt 34, as shown in FIG. 3, is to press the sausage chain 1 against the wheel's peripheral groove 14 as the sausage chain 1 is directed to the loop-forming machine from the stuffing machine on the right as shown by the direction arrow in FIG. 3. The sausage chain 1 is held fast in the wheel's groove 14 and is driven practically slip-free by the wheel 10 due to the compressive force imparted by the belt 34 as it runs between rollers 36 in contact with the sausage chain 1.

In use of the sausage loop-forming machine, the beginning of a chain 1 of sausage links is placed between the belt 34 and the wheel 10, 10b into the groove 14. The wheel's drive, shown diagrammatically in FIG. 8, moves the sausage around the wheel 10 toward a conveyor's hook 44. In this way, each linking point 4 between the separate-but-joined sausages, as they follow one sausage 2 after the other, passes across the feeler arm 22 of the probe-type sensor. Normally, the feeler arm 22 is forced down into the split 20 between the shoulders 18 of the wheel 10a, 10b and held there as each sausage link passes the arm 22. But as soon as a linking point 4 passes, the feeler arm 22 springs out, thereby activating the microswitch 24. The activated microswitch 24 transmits an impulse through a connecting wire 26 to an impulse counting device C1-C4 shown in FIG. 8 which is located in the top mount 50. The number of impulses generated by microswitch 24 therefore corresponds to the number of sausage links 2 which have passed the probe-type sensor. The impulse-counting device is set to activate the conveyor's drive mechanism, not shown in detail, after receiving a preselected number of impulses, thereby causing the conveyor to advance as shown by the direction arrow in FIG. 3 after the preselected number of sausage links 2 have passed the feeler arm 22. The setting of the counting device, of course, is made so as to provide a desired length of the sausage loop to be created, thereby providing an easy and single control over the size of that loop.

The forming of the loops 6 takes place as the link chain 1 is discharged vertically downward into the motion path of the double V-shaped hooks 44. The outlet of the feeder mechanism, which corresponds to the channel created by the belt 34 and wheel's groove 14 where wheel 10 contact with the sausage chain 1 ends, is located above and vertical to the path of hooks 42 at the location on the conveyor's endless path where the hooks turn about a sprocket and, therefore, have the greatest distance between successive hooks. Preferably, and through pivotal adjustment of the probe support 28 relative to wheel axis 11, when microswitch 24 gives off an impulse, the linking point 4 in sausage chain 1 will be located at the carrier section 63 of the hook 42. As soon as the predetermined number of impulses is reached, as determined by the number set in the impulse counter, the counter and a switch means 112 (FIG. 8) cause the roller chain 40 to move forward. During this forward movement, one of the hooks 42 grabs an adjacent linking point 4 of the sausage chain which is next to it and pulls the chain forward. Also during this forward movement, the feeder mechanism continues to discharge the sausage chain 1 for building a new loop for the following hook, as shown in FIG. 3. As soon as the desired number of impulses is once again reached as determined by the impulse counter, i.e., as soon as a new looped series of sausage links has been built up under the hooks 42, the impulse counter once again activates the switch for causing another forward step movement of the roller chain 40 so that the following hook 42 grabs onto a linking point 4. Therefore, successive sausage chain loops can be formed of a predetermined size, each loop consisting of practically any even or odd number of sausage links desired.

In the illustration of FIG. 3, each loop consists of an even quantity, e.g., 12 sausages. Should the operator desire an uneven quantity in each loop, then the link at the bottom of each loop should be positioned somewhat horizontally, thereby causing the loop opening to be larger. For this purpose, a height-adjustable metal slide 46 with a shelf section 47 is mounted on the frame 44 and is located under and parallel to the roller chain 40. This slide 46 supports the loops from the underside if desired by the operator.

The loop-forming machine may also include a portion simulator device. The portion simulator gives off a "fake" impulse when one of the sausage links 2 has not been properly stuffed. Such an error does not occur frequently, but does come about occasionally and would, without a portion simulator device, allow one of the loops 6 to be longer than the others because of the length of the improperly filled sausage. Such is inconvenient in the subsequent handling of the loops. The portion simulator device functions, on either a length or a time-dependence basis, to provide a "fake" impulse to the impulse counter when a predetermined distance (which is equal to or greater than the length of one sausage, yet less than the length of two sausages) has passed since the last microswitch impulse, or else when a predetermined time period (which is longer than the time between two impulses, but shorter than the time between three impulses during normal operation) has passed since the last microswitch impulse. The electric circuitry for the computation and operation of the portion simulator and impulse counter, together with the drive sources, are preferably located in the top mount 50. This circuitry is disclosed in FIG. 8.

Figure 8:
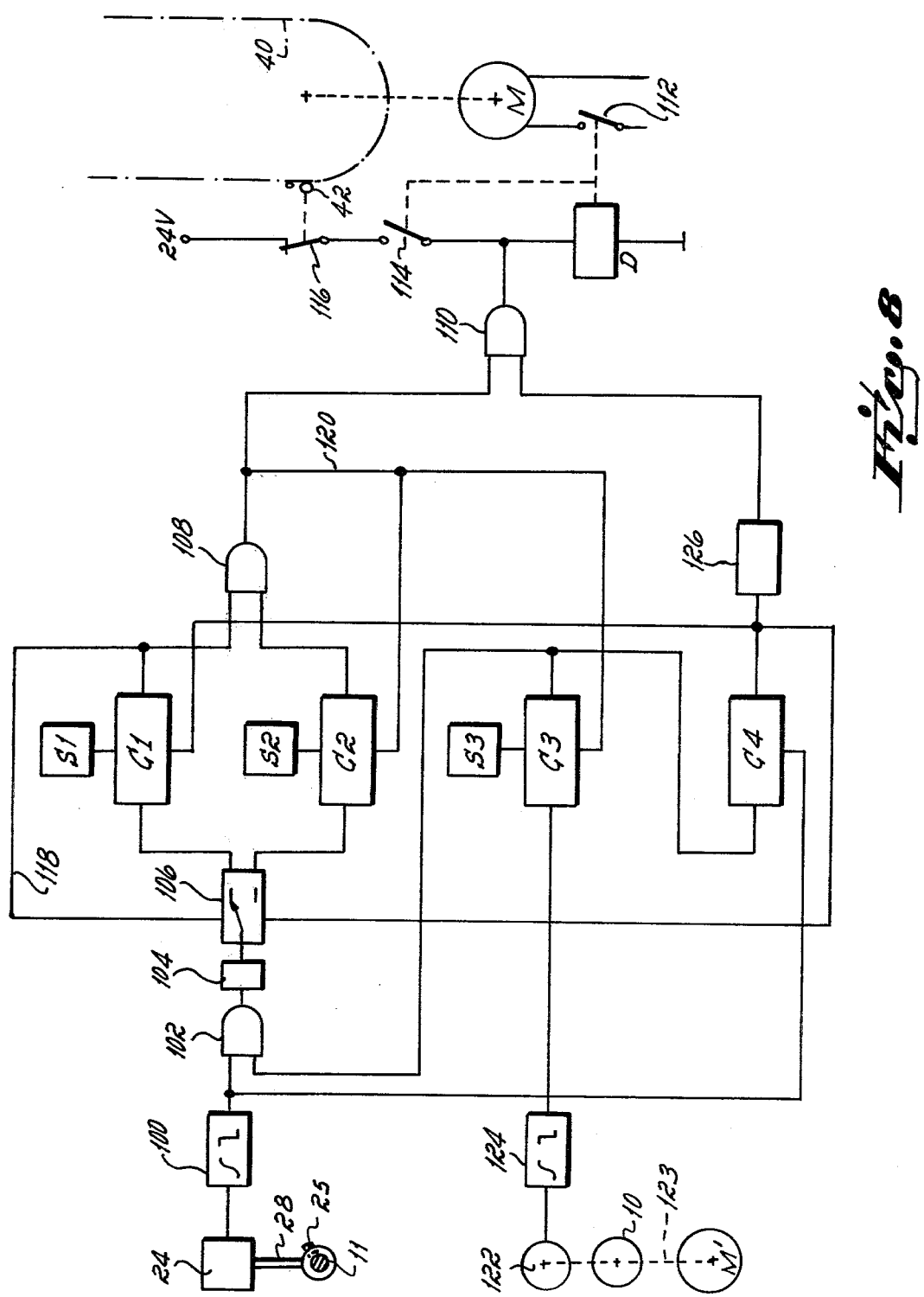
FIG. 8 is a schematic block diagram of the control circuit and drive of the present invention.

As shown in FIG. 8, microswitch 24 is connected through a pulse-forming unit 100 to one input terminal of an OR gate 102. The output of this OR gate 102 is connected through a timing circuit 104 to the input terminal of an electronic switch 106. A first output terminal of switch 106 is connected to a first counter C1 while an alternative or second output terminal of switch 106 is connected to a second counter C2. Depending upon the operational state of switch 106, the pulses from microswitch 24 are transmitted to and counted either by counter C1 or counter C2.

The output of a count-setting device S1 is connected to a control input of counter C1 and the output of a count-setting device S2 is connected to a control input of counter C2. Both setting devices are manually set to a preselected number of counts. Counter C1 or C2 supply a switching pulse to a common OR gate 108 as soon as the number of pulses passing switch 106 equals the number of counts preset in the respective count-setting device S1 or S2. The switching pulse passes through a further OR gate 110. The output of OR gate 110 is used in a manner well known in the art to momentarily actuate a drive-switching relay D. This relay has contacts 112, 114. Contact 112 is connected in series between the main power supply and the drive motor M for the roller chain 40. Thus, actuation of relay D has the result that contact or switch 112 closes and causes the roller chain 40 to move forward. The second contact 114 of relay D is a holding contact connected in series between a source of energizing power of, for example, 24 volts and relay D. A further component of this series connection is a normally closed switch 116. Switch 116 is opened for a short moment whenever one of the hooks 42 connected to the roller chain 40 passes a predetermined position.

As can be seen from FIG. 8, a switching pulse passing through OR gate 110 energizes relay D whereupon relay contacts 112 and 114 are closed. Closing of contact 114 has the result that relay D remains energized even after the termination of the switching pulse. Due to the closed contact 112 the roller chain 40 moves forward until one of its hooks 42 passes the said predetermined position and momentarily opens switch 116. This results in a deenergization of relay D with the consequence that contacts 112 and 114 open so that the forward movement of chain 40 is interrupted. This stepping cycle is repeated whenever a further switching pulse passes OR gate 110.

As discussed earlier, the number of pulses generated by microswitch 24 correspond to the number of sausages passing arm 22 of the microswitch. Assuming that loops comprising 12 sausages each are to be formed, count-setting device S1 is set to the number of 6 and count-setting device S2 is set to the number of 12. At the beginning of the loop-forming operation, switch 106 has the position indicated in FIG. 8 so that the input to switch 106 is passed on to counter C1. As the chain of sausages leaves the sausage-stuffing machine, the microswitch 24 starts to supply pulses to counter C1. After the sixth pulse has reached counter C1, this counter supplies a switching pulse to OR gate 108 which passes OR gate 110 and energizes relay D so that the roller chain 40 steps forward, whereby the leading side of one of the hooks 42 moves the down-hanging first part of the chain out of its original vertical line. The result is that all further down-coming sausages will move downwardly on the trailing side of said hook 42.

The switching pulse coming from counter C1 is not only passed through OR gate 102, but also through a line 118 to one of the switching terminals of electronic switch 106. Thus, each switching pulse generated by counter C1 actuates switch 106 so that all further pulses appearing at the input terminal of switch 106 are transferred to counter C2. Under the above assumption, counter C2 counts 12 incoming pulses before generating a switching pulse which is passed through OR gates 108, 110 to relay D which then causes the roller chain 40 to step forward a second time and to bring the next hook 42 into position for forming the next loop.

The switching pulses appearing at the output of OR gate 108 are not only fed to OR gate 110, but simultaneously to a reset line 120 to which the reset input of counter C2 is connected. Thus, each switching pulse supplied through OR gate 108 initiates a stepping cycle for the roller chain 40 and also resets counter C2. This counter is thereby enabled to count the predetermined number of sausages for the next loop. The described operation is repeated until the last sausage of the chain of sausages has passed the microswitch 24.

In order to enable the system to recognize the end of a chain of sausages and to avoid counting errors which might occur due to missing or dificient linking points 4 between subsequent sausages, a portion simulator is preferably provided.

A sensor 122 is schematically shown in FIG. 8 and is connected to the wheel 10 or its drive so as to deliver a fixed number of pulses per each revolution of wheel 10. Wheel 10 is driven from a motor M' through any suitable drive indicated by dotted line 123. Sensors for this purpose are well known in the art. The pulses supplied by sensor 122 are fed through a pulse-forming unit 124 to a further counter C3. A count-setting device S3 is connected to counter C3. It should be noted that for a given diameter of the wheel 10 a certain number of pulses generated by sensor 122 correspond to a certain distance or length. Thus, count-setting device S3 can be set to a number of pulses from sensor 122 to correspond to the standard length of each sausage within the chain of sausages. Whenever this predetermined number of pulses has been counted by counter C3, this counter provides the above-discussed "fake" pulse, thereby simulating passing by of a sausage. This fake pulse is fed through OR gate 102, timing circuit 104, switch 106 to counter C1 or counter C2. Thus, in the absence of a pulse from microswitch 24, the fake pulse from counter C3 enables counters C1 or C2 to continue counting in the desired manner. The reset terminal of counter C3 is also connected to reset bus 120 and is therefore reset whenever a switching pulse passes OR gate 103.

Timing circuit 104 is triggered from a first state into a second state by each first pulse passing OR gate 102 and, if triggered, delivers a pulse through electronic switch to counter C1 or C2, respectively. The timing circuit 104 has a sufficiently long relaxation period of, for instance, 80 milliseconds. Thus, if a second pulse appears at the input of the timing circuit 104 during the relaxation period either from microswitch 24 or from counter C3, this second pulse is not counted. In this way, slight time variations between the occurrence of proper pulses from microswitch 24 and fake pulses from sensor 122 have no negative result on the counting and the length of the loops.

The output pulses from counter C3 are not only fed to OR gate 102, but simultaneously to the input terminal of a further counter C4. The reset terminal of counter C4 is connected to the output terminal of pulse-forming unit 100 so that counter C4 is reset whenever the microswitch 24 generates a pulse. Counter C4 is set to count a predetermined fixed number of fake pulses, this fixed number being, for instance, 3. Due to its reset connection, counter C4 can count the fixed number only in the absence of pulses coming from microswitch 24. The absence of two or three pulses from microswitch 24 means that the end of the chain of sausages has passed the position of the microswitch and that therefore the loop-forming operation can be terminated. In order to reset the loop-forming machine and the entire counting system, counter C4 delivers an output pulse after having counted the fixed number of counts. This output pulse is fed to the reset terminal of counter C1, to an actuating input of the electronic switch 106, resetting this switch into the state shown in FIG. 8, and is also fed into a duplicating unit 126. Upon the occurrence of a pulse from counter C4, unit 126 generates two switching pulses which are transmitted through OR gate 110 to the relay D with the consequence that the drive for the roller chain 40 is stepped twice. This provides for sufficient space between the end of one loop and the beginning of the subsequent loop of two sausage chains.

After the termination of the discussed loop-forming operation, loop forming of a new chain of sausages can commence in the described manner.

All circuit components described in connection with FIG. 8 are components well known in the art and supplied by various manufacturers. The counters, for instance, are integrated circuits of the type H 157 supplied by SGS-ATES Semiconductor Corporation, Newtonville, Massachusetts 02160.

From the foregoing disclosure of the general principles of the present invention and the above detailed description of a preferred embodiment, those skilled in the art will readily comprehend various modifications to which the invention is susceptible. For example, while in the preferred embodiment hooks 42 are configurated to form V's in two planes, it is contemplated that the arms of these hooks may be interconnected in U-shaped configurations if desired. While in the preferred embodiment the link-sensing probe is mounted within wheel 10, it is contemplated that this probe can be mounted outside of the wheel if desired. In addition, it is contemplated that wheel 10 can be eliminated if the present feeder is used in conjunction with a sausage machine having a vertical discharge. Accordingly, we desire to be limited only by the scope of the following claims.

Having described our invention, we claim:

1. An improved loop-forming machine for use with a chain of sausage links, said machine comprising:
   a series of hooks connected at spaced intervals to an endless length conveyor disposed in a horizontal plane, each of said hooks having a generally V-shaped section, said V-shaped section including an end arm extending upwardly and forwardly, said V-shaped section being open in the direction of the advance of the sausage loop-forming conveyor;
   a feeder mechanism adapted to discharge the sausage chain in generally vertical fashion into the path of said hooks for forming sausage chain loops on each of said hooks; and
   a sensor operable to sense the number of individual sausage links discharged by said feeder mechanism, means responsive to said sensor for controlling advancement of said conveyor to deposit a selected loop size formed on each of said hooks.

2. An improved loop-forming machine as set forth in claim 1 in which each of said hooks is of V-shape in two planes.

3. An improved loop-forming machine as set forth in claim 1 in which said sensor comprises a feeler arm normally biased against the sausage chain, said feeler arm being operative to sense the number of sausage link joints that pass said feeler arm; and
   switch means connected with said feeler arm and with said conveyor, said switch means being operative to control the travel of said conveyor in response to the number of individual sausage link joints sensed by said feeler arm.

4. An improved loop-forming machine as set forth in claim 1, said feeder mechanism comprising:
   a rotatable wheel; and
   an endless belt spaced from the periphery of said wheel, said endless belt cooperating with said wheel's periphery for establishing a controlled discharge of the length sausage chain into loop-forming relation with said conveyor.

5. An improved loop-forming machine as set forth in claim 4 in which said wheel comprises:
   two spaced discs defining a peripheral surface and a gap therebetween, at least a portion of said sensor device being disposed interiorly of said wheel as formed by said discs, said sensor device portion including a feeler arm that extends through said gap beyond said peripheral surface.

6. An improved loop-forming machine as set forth in claim 4 in which said sensor is adjustably mounted in selected paths about the axis of said wheel.

7. The improved loop-forming machine of claim 4 in which the sensor is a microswitch having a feeler arm connected thereto.

8. The improved loop-forming machine of claim 1 in which the sensor output is applied to an impulse counter, said counter being connected to a switch for controlling movement of said conveyor.

9. The improved loop-forming machine of claim 8 further including a portion simulator for transmitting pulses to the impulse center.

10. An improved loop-forming machine for use with a chain of sausage links, said machine comprising:
 a series of hooks connected to an endless length, horizontally disposed conveyor, each of said hooks having a sausage loop-retaining end, this conveyor having a drive motor;
 a feeder mechanism disposed above said conveyor and adapted to discharge the sausage chain into loop-forming relation with said conveyor hooks, said feeder mechanism comprising a rotatable wheel having a peripheral groove and an endless belt spaced from the periphery of said wheel, said endless belt cooperating with said wheel's periphery for establishing a controlled discharge of the sausage chain; and
 a sensor, said sensor being operable to sense the number of individual sausage links discharged by said feeder mechanism, said sensor being in controlling relationship with said conveyor drive motor for controlling the sausage loop size formed on each of said hooks.

11. An improved loop-forming machine as set forth in claim 10 in which said wheel comprises:
 two spaced discs defining a peripheral groove and a gap therebetween, at least a portion of said sensor device being disposed interiorly of said wheel as formed by said discs, said sensor device portion including a feeler arm that extends through said gap into said peripheral groove.

12. An improved loop-forming machine as set forth in claim 10, said sensor device comprising:
 a feeler arm normally biased against the sausage chain, said feeler arm being operative to sense the number of sausage link joints that pass said feeler arm; and
 switch means connected with said feeler arm and with said conveyor, said switch means being operative to control the travel of said conveyor in response to the number of individual sausage link joints sensed by said feeler arm.

13. An improved loop-forming machine as set forth in claim 10, each hook comprising:
 a generally V-shaped loop retaining end, said V-shaped end being of a first generally V-shaped configuration when viewed in top plan view thereof relative to the horizontal, and said V-shaped end opening in the travel path direction of the loop-forming run of said conveyor.

14. An improved loop-forming machine as set forth in claim 13, each retaining end of said hook further having:
 a second generally V-shaped configuration when viewed in side plan view thereof in a direction generally normal to the travel path direction of the loop forming run of said conveyor, said second V-shaped configuration opening upwardly relative to the horizontal.

15. An improved loop-forming machine as set forth in claim 14, each of said hooks also having:
 a connector section connecting said V-shaped end with said endless conveyor, said V-shaped end extending generally downwardly from said connector section.

* * * * *

UNITED STATES PATENT AND TRADEMARK OFFICE
CERTIFICATE OF CORRECTION

PATENT NO. : 4,218,003
DATED : August 19, 1980
INVENTOR(S) : Manfred Plewa et al It is certified that error appears in the above-identified patent and that said Letters Patent are hereby corrected as shown below:

On the title page, under "Inventors", "Claus-Dieter Jaschinski, Verden" should be -- Claus-Dieter Jaschinski, Verden/Aller --.

Column 3, line 2 "hank" should be --hang --.

Column 6, line 52 "dificient" should be -- deficient --.

Column 9, line 3 "center" should be -- counter --.

Signed and Sealed this

Thirtieth Day of December 1980

[SEAL]

Attest:

SIDNEY A. DIAMOND

Attesting Officer

Commissioner of Patents and Trademarks